Jan. 3, 1933. H. F. HYMAN 1,892,952
VERMIN TRAP
Filed June 5, 1931

Inventor
Henry F. Hyman.

By Hardway Cathey
Attorneys

Patented Jan. 3, 1933

1,892,952

UNITED STATES PATENT OFFICE

HENRY F. HYMAN, OF HOUSTON, TEXAS

VERMIN TRAP

Application filed June 5, 1931. Serial No. 542,336.

This invention relates to a vermin trap.

An object of the invention is to provide a trap of the character described specially designed for the purpose of catching ants, roaches and similar vermin and shaped to surround the legs of kitchen furniture such as tables, refrigerators and the like to exclude the vermin from the articles of furniture protected thereby.

Another object of the invention is to provide a device of the character described formed of sections so that it may be readily placed around the legs of the article to be protected.

A further feature of the invention resides in the provision of a removable collector into which the trapped vermin will finally collect.

With the above and other objects in view the invention has particular relation to certain novel features of construction, arrangement of parts and use, an example of which is given in this specification and illustrated in the accompanying drawing, wherein.

Figure 1:
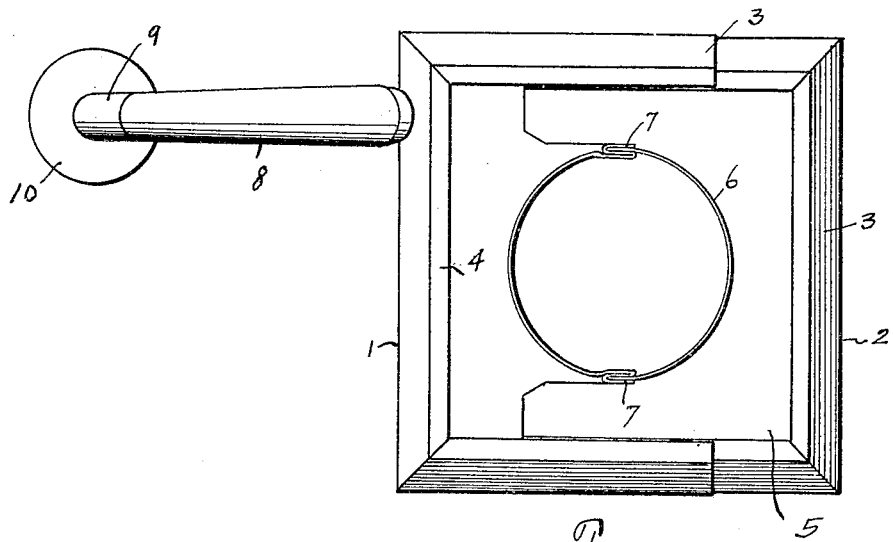
Figure 1 shows a plan view of the trap.

In the drawing the numerals 1 and 2 designate the sections of the trap which, when assembled, present the outer wall 3 which inclines upwardly and around the upper margin of the walls there is an inwardly and downwardly declining baffle 4. The numeral 5 designates the bottom of the trap. This bottom has the central portion cut away and upstanding from the inner margin of the bottom around the cut away portion there is the sleeve like guard 6 which extends upwardly above the upper margin of the outer wall 3.

Figure 2:
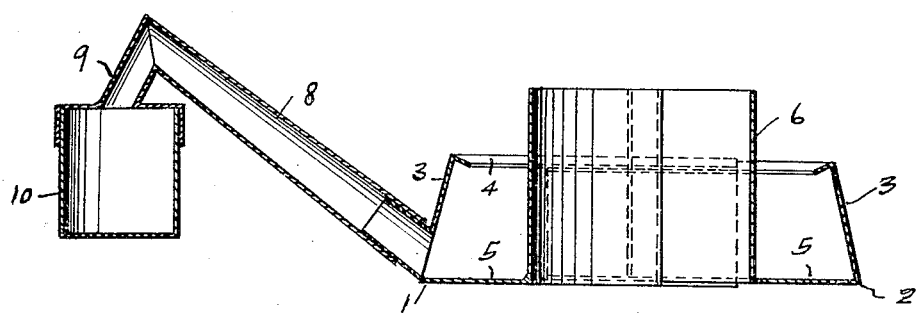
Figure 2 shows a transverse sectional view.

The adjacent portions of the sections 1, 2 overlap, the overlapping side walls dovetailing together as shown in Figures 1 and 2 and the overlapping portions of the bottom 5 fitting closely together. The margins of one section of the guard 6 has the vertical grooves into which the adjacent margins of the other section of said guard fit so that the trap can be readily assembled around the leg. The vermin will move up over the inwardly inclined wall 3 and will pass over the baffle 4 into the trap and the outer surface of the guard 6 is made smooth so that the vermin can not pass up this guard. There is a tubular run way 8 leading upwardly and outwardly from the trap and which is detachable therefrom and the outer end 9 of this runway is turned downwardly and has a cup shaped collector 10 detachably secured thereto. The vermin will pass up said runway and down into the collector 10 until the collector is filled and it may then be readily detached and the collected vermin destroyed.

The drawing and description disclose what is now considered to be a preferred form of the invention by way of illustration only while the broad principle of the invention will be defined by the appended claims.

What I claim is:

1. A vermin trap having an outer wall and an inner wall spaced apart forming a chamber between them, an inwardly extending baffle around the upper margin of the outer wall, said outer and inner walls being formed of two independent sections, the sections of the outer wall being shaped to dovetail together and the sections of the inner wall being formed, one with vertical grooves into which the adjacent margins of the other fit when the sections are in assembled relation.

2. A vermin trap having an outer wall, an inwardly declining baffle around the upper margin of said wall, a sleeve-like guard spaced inwardly from the outer wall and forming an inner wall which extends upwardly above the outer wall, a bottom between the outer and inner walls, said outer and inner walls and said bottom being formed of sections, the adjacent portions of the outer wall being shaped to dovetail together and the adjacent portions of the bottom being formed to overlap and the adjacent margins of the inner wall being provided one with a groove into which the other fits when said sections are assembled together, a tubular runway leading upwardly and outwardly from one section and a detachable collector carried by the outer end of the runway.

In testimony whereof I have signed my name to this specification.

HENRY F. HYMAN.